(12) United States Patent
Ootaka

(10) Patent No.: US 8,354,936 B2
(45) Date of Patent: Jan. 15, 2013

(54) CAPACITIVE PASSENGER DETECTOR FOR VEHICLE

(75) Inventor: Kouji Ootaka, Toyohashi (JP)

(73) Assignee: Denso Corporation, Kariya (JP)

( * ) Notice: Subject to any disclaimer, the term of this patent is extended or adjusted under 35 U.S.C. 154(b) by 470 days.

(21) Appl. No.: 12/802,824

(22) Filed: Jun. 15, 2010

(65) Prior Publication Data

US 2010/0315251 A1    Dec. 16, 2010

(30) Foreign Application Priority Data

Jun. 16, 2009  (JP) ................................. 2009-143321

(51) Int. Cl.
  G08B 21/00  (2006.01)
  G08B 13/18  (2006.01)
  B60R 22/00  (2006.01)
  B60R 21/16  (2006.01)
  B60K 28/00  (2006.01)

(52) U.S. Cl. ........ 340/667; 340/660; 340/664; 340/562; 340/552; 340/426.26; 340/636.11; 340/665; 340/666; 340/573.1; 701/45; 324/661; 324/662; 324/663; 180/272; 180/273; 280/735

(58) Field of Classification Search .................. 340/660, 340/664, 667, 666, 665, 562, 561, 663, 567, 340/551, 552, 426.26, 565, 636.11, 636.12; 701/45; 280/734, 735; 180/272, 273
See application file for complete search history.

(56) References Cited

U.S. PATENT DOCUMENTS

| | | | |
|---|---|---|---|
| 6,335,684 B1* | 1/2002 | Eisenmann et al. | 340/562 |
| 6,696,948 B2* | 2/2004 | Thompson et al. | 340/561 |
| 7,271,730 B2* | 9/2007 | Kimura et al. | 340/667 |
| 7,497,465 B2* | 3/2009 | Wato et al. | 280/735 |
| 7,575,085 B2* | 8/2009 | Kamizono et al. | 180/273 |
| 7,791,476 B2* | 9/2010 | Hawkins et al. | 340/561 |
| 7,796,017 B2* | 9/2010 | Kiribayashi | 340/425.5 |
| 8,040,241 B2* | 10/2011 | Kamizono et al. | 340/561 |
| 8,049,520 B2* | 11/2011 | Schleeh | 324/663 |
| 8,078,362 B2* | 12/2011 | Yamanaka et al. | 701/45 |
| 8,120,483 B2* | 2/2012 | Ootaka et al. | 340/561 |
| 2008/0100425 A1 | 5/2008 | Kiribayashi | |
| 2008/0198024 A1 | 8/2008 | Kamizono et al. | |

FOREIGN PATENT DOCUMENTS

| | | |
|---|---|---|
| JP | 11-23608 | 1/1999 |
| JP | 2008-111809 | 5/2008 |
| JP | 2008-203150 | 9/2008 |
| WO | WO 2007/147735 | 12/2007 |

* cited by examiner

Primary Examiner — Daniel Wu
Assistant Examiner — Mancil Littlejohn
(74) Attorney, Agent, or Firm — Harness, Dickey & Pierce, PLC

(57) ABSTRACT

A capacitive passenger detector includes: a capacitive sensor having main, sub and guard electrodes; a sensor characteristic measurement unit for applying an alternating voltage signal to each electrode and for converting a current in each electrode to a voltage; and a controller. The controller defines a current in the guard electrode as a reference current when voltages of the main and guard electrodes have a same potential. The controller defines a current flowing direction of the guard electrode to be negative when the voltage of the main electrode is higher than the guard electrode. The controller defines the current flowing direction of the guard electrode to be positive when the voltage of the main electrode is lower than the guard electrode. The controller corrects the voltage of the main electrode based on the current of the guard electrode so that a corrected voltage is set to be a passenger determination data.

7 Claims, 4 Drawing Sheets

CAPACITIVE PASSENGER DETECTOR FOR VEHICLE

CROSS REFERENCE TO RELATED APPLICATION

This application is based on Japanese Patent Application No. 2009-143321 filed on Jun. 16, 2009, the disclosure of which is incorporated herein by reference.

FIELD OF THE INVENTION

The present invention relates to a capacitive passenger detector for detecting a passenger status of a passenger sitting down in a seat of a vehicle.

BACKGROUND OF THE INVENTION

A capacitive passenger detector is described in JP-A-2008-203150 corresponding to U.S. patent application Publication No. 2008/0198024. The detector includes a capacitive sensor. The capacitive sensor includes a main electrode disposed on a seat of a vehicle, a sub electrode disposed on the same seat, and a guard electrode disposed just below the main electrode. The sub electrode is spaced apart from the main electrode, and the sub electrode and the main electrode are arranged along with a front-rear direction of the vehicle. The guard electrode is arranged between a body of the vehicle and the main electrode, and spaced apart from the main electrode. The body is electrically coupled with a ground of the vehicle.

When the capacitive sensor measures a capacitance of the passenger on the seat, the main electrode and the guard electrode have the same electric potential. Thus, an electric field is formed between the main electrode and the body so that the capacitance of the passenger is detected. Specifically, the capacitive sensor detects disorder of weak electric field generated between the main electrode and the body so that the capacitive sensor outputs a current or a voltage corresponding to the detected disorder, i.e., a change of the electric field. Based on the current or the voltage, a passenger detection ECU as an electric control unit determines whether the passenger sits down in the seat.

In the above detector, as shown in FIG. 1, a passenger detection ECU 1 is coupled with a capacitive sensor 2. When a capacitance of a passenger in a vehicle is detected, a main electrode and a guard electrode have the same electric potential. When a potential difference between the main electrode and the guard electrode is zero, an output current from the main electrode is the same as an output current from the guard electrode. Thus, the current from the main electrode and the current from the guard electrode do not interact with each other. Thus, a proper capacitance CH of the passenger is obtained. Here, a reference CMG in FIG. 1 represents a capacitance between the main electrode and the guard electrode. A reference CB represents an error capacitance between the guard electrode and a body of the vehicle. A reference CH represents a capacitance of the passenger. A reference Y1 represents an output current corresponding to the capacitance CH of the passenger. A reference Y2 represents an output current corresponding to the error capacitance CB.

However, in the capacitive passenger detector, the area of each electrode is enlarged so as to increase a detection sensitivity of the capacitive sensor 2. Accordingly, the capacitance CH between the main electrode and the guard electrode increases. Thus, it is difficult to control the potential difference between the main electrode and the guard electrode to be the same potential with using the passenger detection ECU 1. Accordingly, when the potential difference between the main electrode and the guard electrode is generated, the output current from the main electrode is different from the output current from the guard electrode. Thus, the output current from the main electrode and the output current from the guard electrode interact with each other so that they interfere with each other. Thus, as shown in FIG. 2, a current shown as an arrow Y3 in FIG. 2 flows from the main electrode to the guard electrode. Alternatively, a current shown as an arrow Y4 in FIG. 2 flows from the guard electrode to the main electrode. Thus, the current Y3, Y4 affects the detection current for detecting the capacitance of the passenger so that the detection current is changed. Thus, the ECU 1 cannot detect the proper capacitance of the passenger.

SUMMARY OF THE INVENTION

In view of the above-described problem, it is an object of the present disclosure to provide capacitive passenger detector for detecting a passenger status of a passenger sitting down in a seat of a vehicle. Even when a potential difference between a main electrode and a guard electrode in a capacitive sensor is generated, the detector detects a capacitance of the passenger correctly.

According to an aspect of the present disclosure, a capacitive passenger detector for a vehicle includes: a capacitive sensor including a main electrode, a sub electrode and a guard electrode, wherein the main electrode and the sub electrode are separated apart from each other, and disposed in a seat of a vehicle, and wherein the guard electrode is disposed between the main electrode and a body of the vehicle, and separated apart from the main electrode; a sensor characteristic measurement unit for applying an alternating voltage signal to the main electrode, the sub electrode and the guard electrode selectively or totally and for converting a current generated in the main electrode, the sub electrode and the guard electrode to a voltage; respectively; and a controller. The controller defines a current flowing through the guard electrode to be a reference current when a voltage of the main electrode and a voltage of the guard electrode have a same potential. The controller defines a current flowing direction of the current flowing through the guard electrode to be a negative direction when the voltage of the main electrode is higher than the voltage of the guard electrode. The controller defines the current flowing direction of the current flowing through the guard electrode to be a positive direction when the voltage of the main electrode is lower than the voltage of the guard electrode. The controller corrects the voltage of the main electrode based on the current flowing through the guard electrode so that a corrected voltage of the main electrode is set to be a passenger determination data.

In the above detector, even when the potential difference is generated between the main electrode and the guard electrode, the controller detects the capacitance of the passenger correctly.

Alternatively, the controller may set the voltage of the main electrode to be the passenger determination data when the current flowing through the guard electrode is the reference current.

Alternatively, the controller may correct the voltage of the main electrode in such a manner that the voltage of the guard electrode is add into the voltage of the main electrode when the current flowing direction of the guard electrode is the negative direction. The controller sets the corrected voltage of the main electrode to be the passenger determination data.

Alternatively, the controller may correct the voltage of the main electrode in such a manner that the voltage of the guard electrode is subtracted from the voltage of the main electrode when the current flowing direction of the guard electrode is the positive direction. The controller sets the corrected voltage of the main electrode to be the passenger determination data.

Alternatively, the sub electrode may be arranged on a front side of the vehicle from the main electrode, and the guard electrode may be disposed below the main electrode. Further, the controller may correct the voltage of the main electrode in such a manner that the voltage of the sub electrode is added into the voltage of the main electrode. The controller sets the corrected voltage of the main electrode to be another passenger determination data. Furthermore, the voltage of the main electrode may correspond to a capacitance between the main electrode and a ground. The voltage of the guard electrode may correspond to a capacitance between the guard electrode and the ground. The voltage of the sub electrode may correspond to a capacitance between the sub electrode and the ground.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
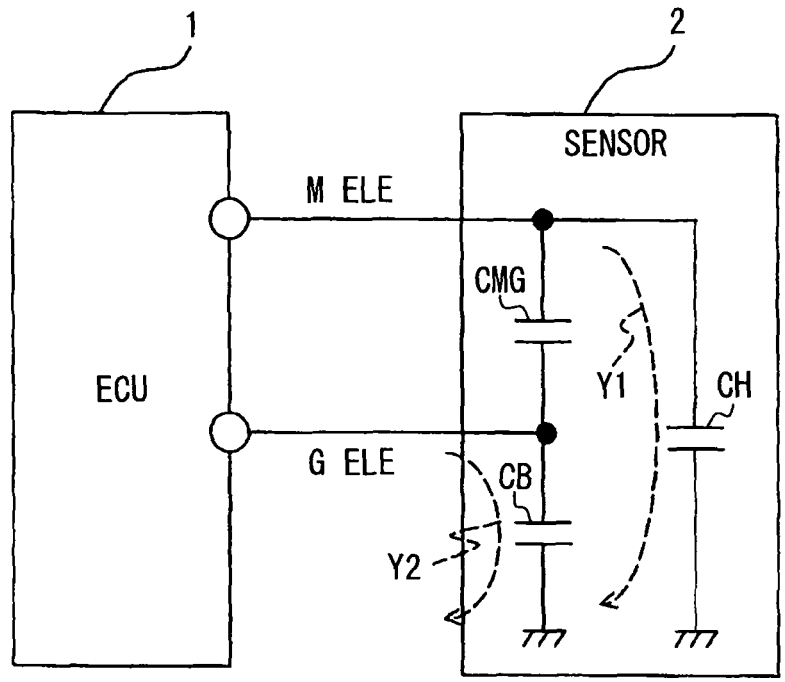
FIG. 1 is a diagram showing an output current from a main electrode when a potential difference between the main electrode and a guard electrode in a capacitive sensor is zero.
Figure 2:
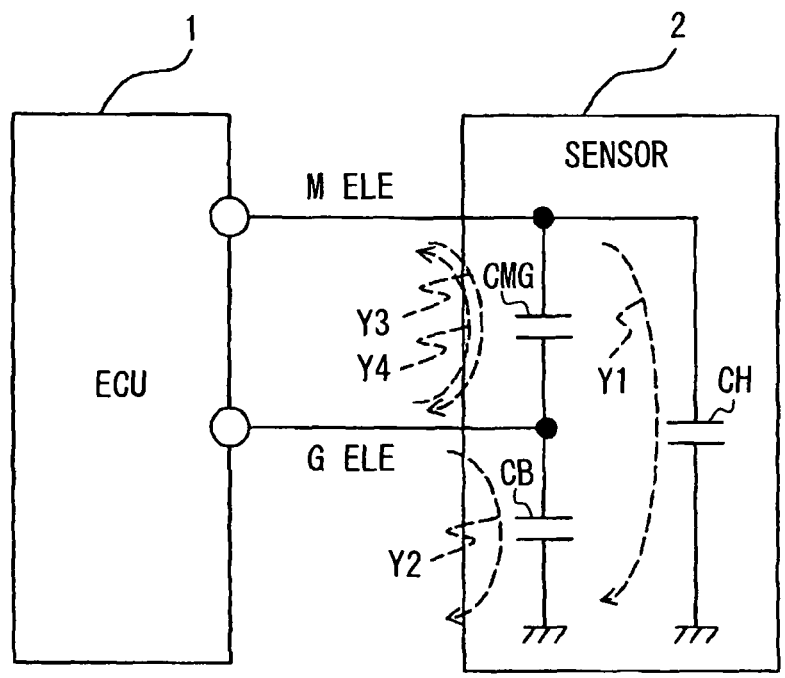
FIG. 2 is a diagram showing an output current from a main electrode when a potential difference between the main electrode and a guard electrode in a capacitive sensor is not zero.
Figure 3:
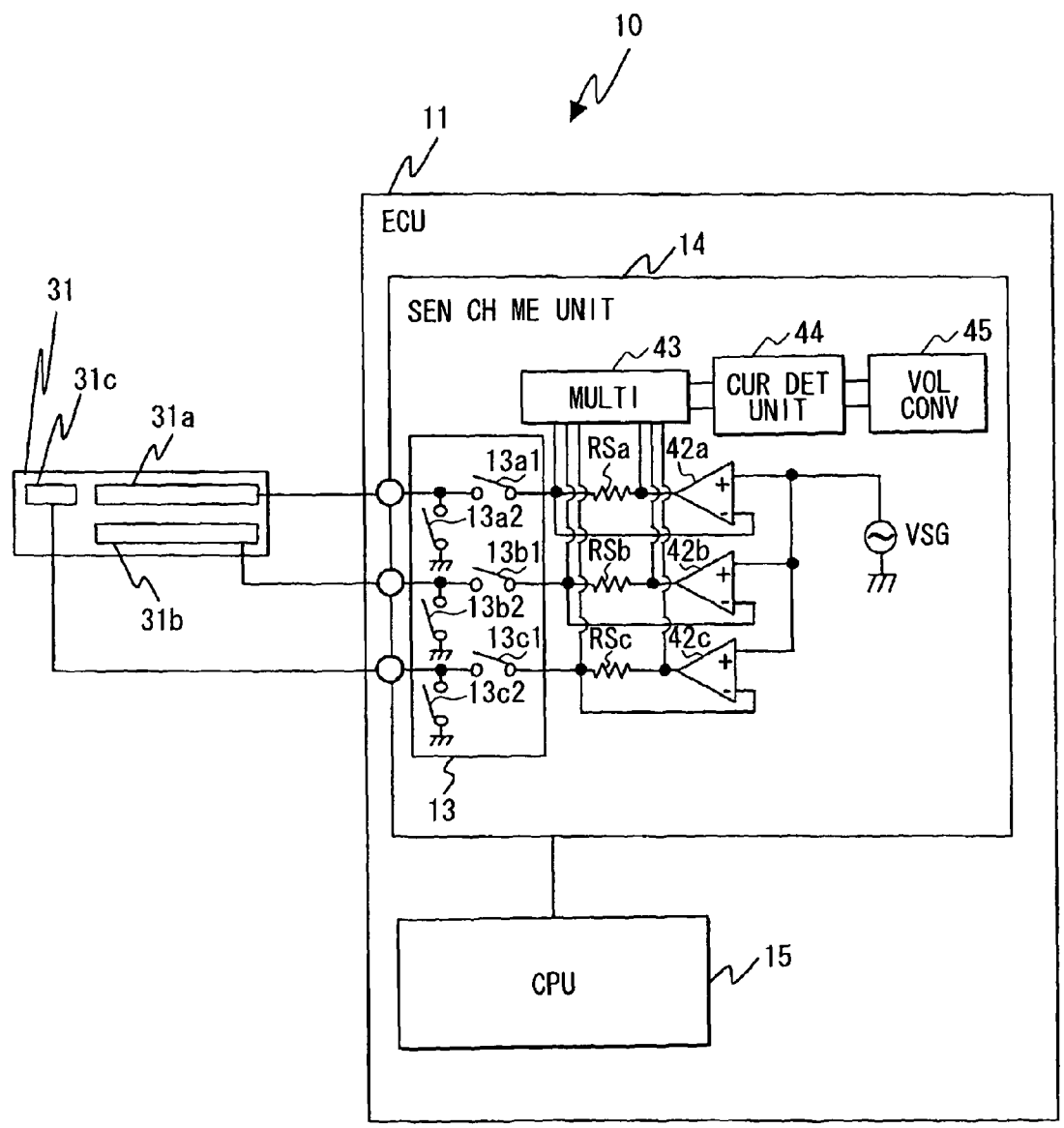
FIG. 3 is a diagram showing a capacitive passenger detector according to an example embodiment.

FIG. 3 shows a capacitive passenger detector 10 according to an example embodiment. The detector 10 includes a passenger detection ECU 11 and a capacitive sensor 31, which is coupled with the ECU 11. The capacitive sensor 31 includes a main electrode 31a, a sub electrode 31c and a guard electrode 31b. The main electrode 31a is arranged under a seat of a vehicle (not shown). The sub electrode 31c is spaced apart from the main electrode 31a, and arranged under the seat on a front side of the vehicle from the main electrode 31a. The guard electrode 31b is disposed just below the main electrode 31a by a predetermined distance between the guard electrode 31b and the main electrode 31a. The guard electrode 31b is disposed between the main electrode 31a and a body of the vehicle, which provides aground for coupling with a vehicle ground portion (not shown).

The ECU 11 includes a sensor characteristic measurement unit 14 and a CPU 15 as a calculation and control element. The measurement unit 14 includes a switching unit 13, current detection resistors RSa, RSb, RSc connecting to each switch 13a1-13c1 in the switching unit 13, operational amplifiers 42a, 42b, 42c as a driver connecting to the current detection resistors RSa, RSb, RSc, a signal source VSG connecting to a non-inversion input terminal of each operational amplifier 42a-42c, a multiplexer 43, a current detection unit 44 and a voltage converter 45. The switching unit 13 includes a main electrode connection switch 13a1, a guard electrode connection switch 13b1, a sub electrode connections switch 13c1, a main electrode grounding switch 13a2, a guard electrode grounding switch 13b2, and a sub electrode grounding witch 13c2. The multiplexer 43 is coupled with both ends of each current detection resistor RSa, RSb, RSc, and selects one of the current detection resistors RSa, RSb, RSc so that both ends of the one of the current detection resistors RSa, RSb, RSc are coupled with the multiplexer 43. The current detection unit 44 detects a current flowing through the one of the current detection resistors RSa, RSb, RSc, which is selected by the multiplexer 43.

In the above capacitive passenger detector 10, when the main electrode grounding switch 13a2, the guard electrode grounding switch 13b2, and the sub electrode grounding witch 13c2 turn off so that the main electrode grounding switch 13a2, the guard electrode grounding switch 13b2, and the sub electrode grounding witch 13c2 are not coupled with the vehicle ground portion, the main electrode connection switch 13a1, the guard electrode connection switch 13b1, and the sub electrode connections switch 13c1 turn on at a certain time so that a sine wave is output from the signal source VSG, and the sine wave is applied to each operational amplifier 42a-42c and each current detection resistor RSa, RSb, RSc. Then, a potential difference in each current detection resistor RSa, RSb, RSc is generated according to an impedance of a passenger of the vehicle. The passenger sits down on the seat, i.e., the capacitive sensor 31. These potential differences of the current detection resistors RSa, RSb, RSc are selected by the multiplexer 43 sequentially. Then, the multiplexer 43 outputs each potential difference to the current detection unit 44. Thus, the current detected by the current detection unit 44 is converted the voltage converter 45 so that a voltage is obtained. Each capacitance provided by each of the main electrode 31a, the guard electrode 31b and the sub electrode 31c or combinations of the main electrode 31a, the guard electrode 31b and the sub electrode 31c is measured as the voltage. Further, the detected capacitance is processed in the CPU 15 so that the voltage corresponding to the capacitance is processed in an adding process and the like. Thus, passenger detection data is obtained. The passenger detection data is a numerical data, which is used for determination of a status of the passenger on the seat.

The CPU 15 determines based on the passenger detection data whether there is no object on the seat, i.e., whether the seat is vacant, whether a CRS (child restraint system) is operated, and whether the passenger is a child or an adult. Further, the CPU 15 transmits a determination result to an absorber ECU (not shown), the result providing whether an absorber inflates. The absorber ECU controls to activate the absorber on a front passenger seat according to the determination result and a collision determination result when the vehicle collides.

The switching unit 13 switches the main electrode connection switch 13a1, the guard electrode connection switch 13b1, the sub electrode connections switch 13c1, the main electrode grounding switch 13a2, the guard electrode grounding switch 13b2, and the sub electrode grounding witch 13c2 so that capacitances are measured with using an electric force line generated from the capacitive sensor 31. The current flowing through each current detection resistor RSa, RSb, RSc according to the sine wave as a supply signal from the signal source VSG is converted to the voltage. The CPU 15 performs the determination of the passenger based on the capacitance generated between the main electrode 31a and the vehicle ground portion when the switching unit 13 selects the main electrode 31a and the guard electrode 31b. Further, the CPU 15 performs the determination of the passenger based on the capacitance generated between the sub electrode 31c and the vehicle ground portion when the switching unit 13 selects the sub electrode 31c and the guard electrode 31b. Further, when the switching unit 13 selects the main electrode 31a, the sub electrode 31c and the guard electrode 31b, the CPU 15 performs the determination based on the capacitance between the main electrode 31a and the sub electrode 31c whether the seat is wet.

When the ECU 11 performs the determination of the passenger, the switching unit 13 selects both of the main electrode 31a and the guard electrode 31b. In this case, the main electrode 31a and the guard electrode 31b have the same electric potential. Specifically, when the voltage of the electrode 31a and the voltage of the electrode 31b, which are detected by the sensor characteristic measurement unit 14, are equal, the ECU 11 performs the determination of the passenger. In this case, when a electric potential difference is generated between the electrodes 31a. 31b, a flowing direction of the current through the guard electrode 31b is determined so that it is determined whether the flowing direction is a positive direction or a negative direction. The current flowing in the negative direction or the positive direction is compensated, and then, the passenger determination data is obtained. When the electrodes 31a, 31b have no potential difference, the voltage corresponding to the capacitance of the main electrode 31a directly provides the passenger determination data.

Figure 4:
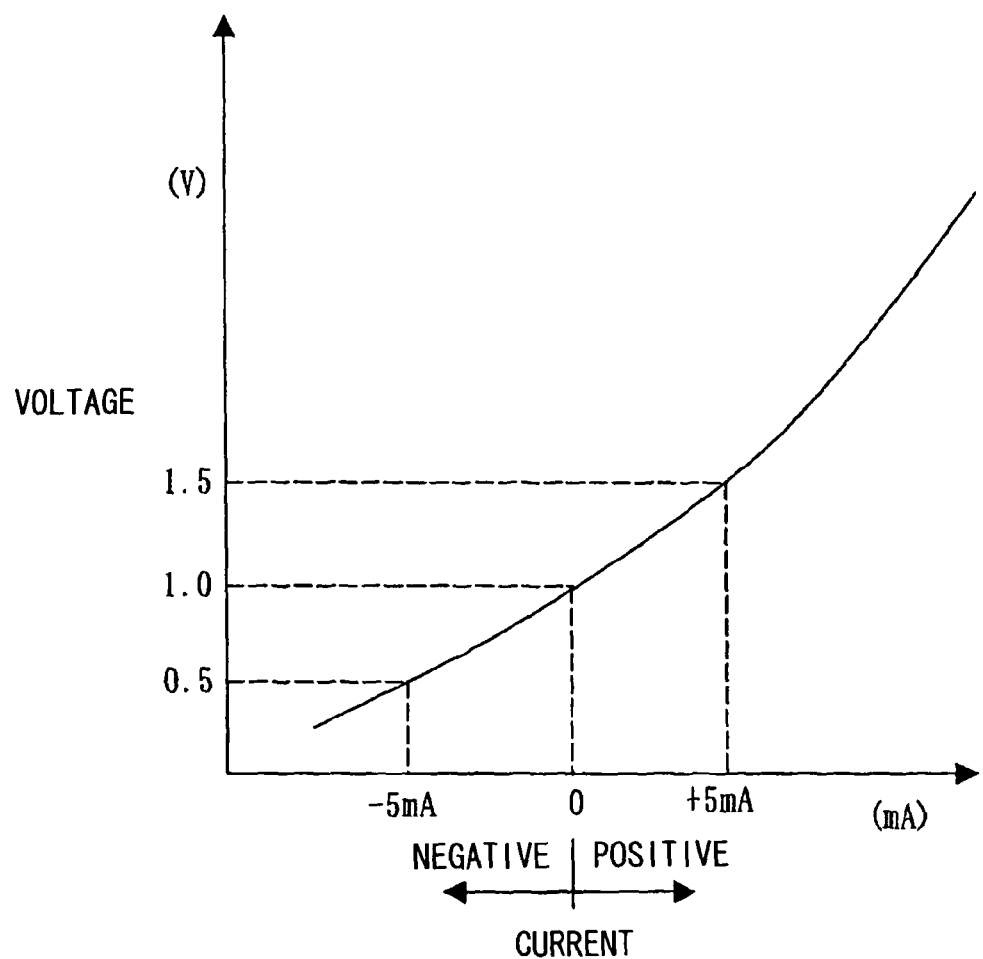
FIG. 4 is a diagram showing a graph of a relationship between a current flowing through a guard electrode and a voltage obtained in a voltage converter of a sensor characteristic measurement unit.

FIG. 4 shows a graph of a relationship between a current flowing through the guard electrode 31b and a voltage obtained in the voltage converter 45 of the sensor characteristic measurement unit 14. For example, as shown in FIG. 4, when the current flowing through the guard electrode 31b is detected to be zero mA as a reference point by the current detection unit 44, the voltage converter 45 converts to be 1.0V. In this case, the current flowing through the main electrode 31a is also zero mA. Thus, the CPU 15 determines that the electric potential difference between the main electrode 31a and the guard electrode 31b is zero. Thus, the measured value corresponding to the capacitance of the main electrode 31a, i.e., the voltage of the voltage converter 45, is defined as the passenger determination data.

When the current flowing through the guard electrode 31b is detected to be −5 mA by the current detection unit 44, the voltage converter 45 converts to be 0.5V. In this case, the CPU 15 defines a current flowing direction from the main electrode 31a to the guard electrode 31b as a "negative direction" since the current actually flows from the main electrode 31a to the guard electrode 31b. When the CPU 15 determines that the current flows in the negative direction, the CPU 15 adds the measured value corresponding to the capacitance of the guard electrode 31b with the measured value corresponding to the capacitance of the main electrode 31a, so that the corrected measured value is defined as the passenger determination data. In this case, the current flowing through the main electrode 31a is zero MA, and the current flowing through the guard electrode 31b is −5 mA, and therefore, the current flows from the main electrode 31a to the guard electrode 31b. Even if the current flowing through the main electrode 31a and the current flowing through the guard electrode 31b are any values, the CPU 15 defines the current flowing direction from the main electrode 31a to the guard electrode 31b as the negative direction. On the other hand, the CPU 15 defines the current flowing direction from the guard electrode 31b to the main electrode 31a as a "positive direction."

For example, when the current flowing through the guard electrode 31b is detected to be +5 mA by the current detection unit 44, the voltage converter converts to be 1.5V. In this case, the CPU 15 determines that the flowing direction of the current flowing through the guard electrode 31b is the positive direction since the current flows from the guard electrode 31b to the main electrode 31a. In this case, the current flows around from the guard electrode 31b to the main electrode 31a. The CPU 15 subtracts the measured value corresponding to the capacitance of the guard electrode 31b from the measured value corresponding to the capacitance of the main electrode 31a, so that the corrected measured value is defined as the passenger determination data.

Figure 5:
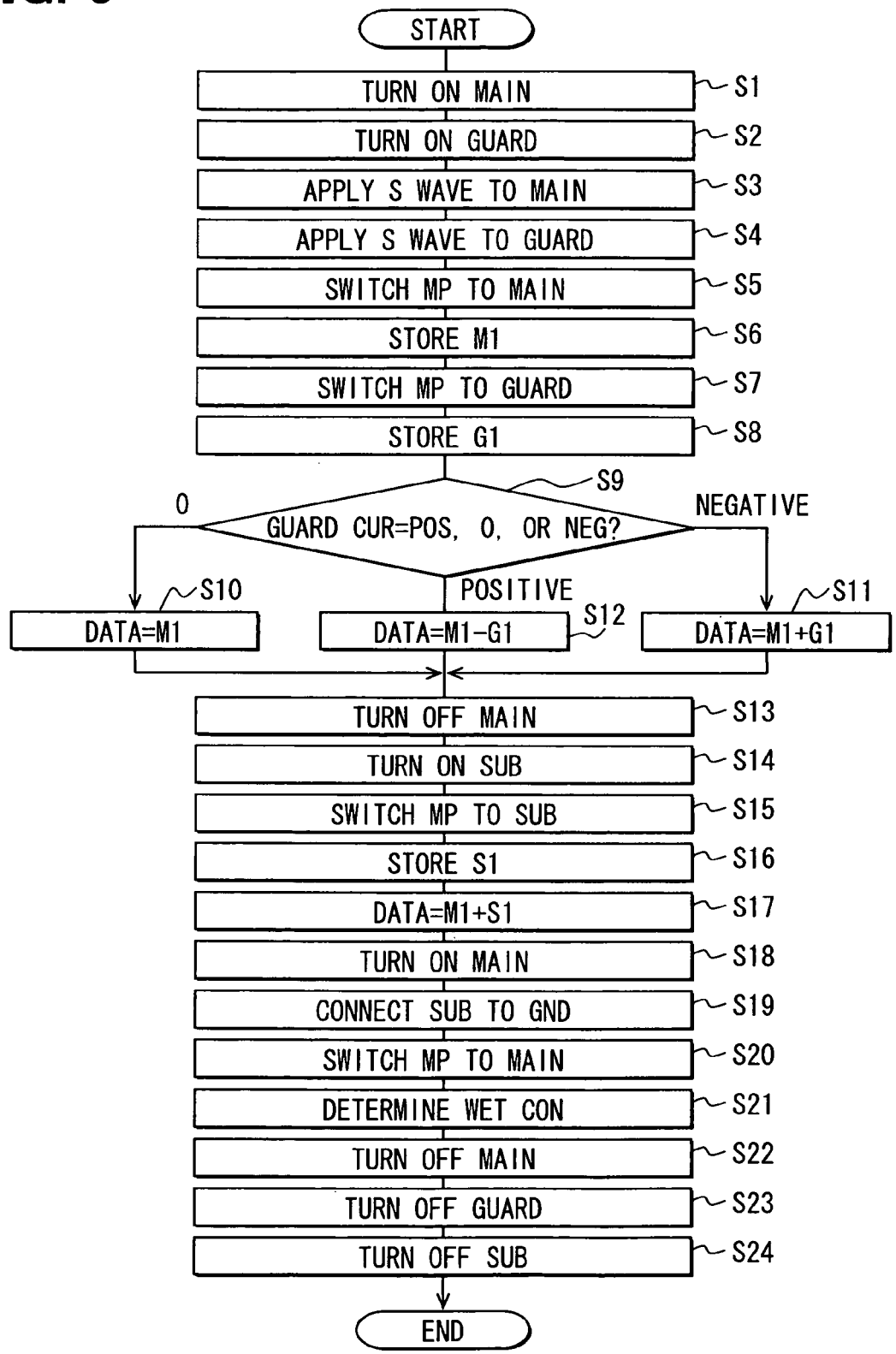
FIG. 5 is a flowchart showing a correction process of a passenger determination data when a potential difference between the main electrode and the guard electrode is generated.

When the capacitive passenger detector 10 determines whether the passenger sits down on the seta of the vehicle, and the potential difference between the main electrode 31a and the guard electrode 31b is generated, the measured value corresponding to the main electrode 31a is corrected according to the following flowchart in FIG. 5 so that the passenger detection data is obtained. In FIG. 5, an initial condition is met such that all of the main electrode connection switch 13a1, the guard electrode connection switch 13b1, the sub electrode connections switch 13c1, the main electrode grounding switch 13a2, the guard electrode grounding switch 13b2, and the sub electrode grounding witch 13c2 turn off.

In step S1, the main electrode connection switch 13a1 turns on. In step S2, the guard electrode connection switch 13b1 turns on. Under these conditions, in steps S3, S4, the sine wave of the signal source VSG is applied to the main electrode 31a, and further the sine wave of the signal source VSG is applied to the guard electrode 31b. Thus, the passenger is detected based on the capacitance generated between the main electrode 31a and the vehicle ground portion.

In step S5, the multiplexer 43 switches to a state that a potential difference between both ends of the current detection resistor RSa, which is connected to the main electrode 31a, is detected. Thus, the current corresponding to the capacitance of the passenger detected by the main electrode 31a is detected by the current detection unit 44. This current is converted to the voltage by the voltage converter 45. In step S6, the converted voltage is stored as a measured value M1 of the main electrode 31a in the CPU 15.

In step S7, the multiplexer 43 switches to a state that a potential difference between both ends of the current detection resistor RSb, which is connected to the guard electrode 31b, is detected. Thus, the current corresponding to the capacitance of the passenger detected by the guard electrode 31b is detected by the current detection unit 44. This current is converted to the voltage by the voltage converter 45. In step S8, the converted voltage is stored as a measured value G1 corresponding to the capacitance of the guard electrode 31b in the CPU 15.

In step S9, the CPU 15 determines whether the current flowing through the guard electrode 31b is zero, or the current flows in the positive direction or the negative direction. As a result, when the current flowing through the guard electrode 31b is zero, the CPU 15 sets the measured value M1 corresponding to the capacitance of the main electrode 31a to be the passenger determination data in step S10. Further, when the CPU 15 determines that the current flowing through the guard electrode 31b is the negative direction, the CPU 15 add the measured value G1 corresponding to the capacitance of the guard electrode 31b with the measured value M1 corresponding to the capacitance of the main electrode 31a in step S11, and then, the CPU 15 sets the corrected measured value M1 to be the passenger determination data.

When the CPU 15 determines that the current flowing through the guard electrode 31b is the positive direction, the CPU 15 subtracts the measured value G1 corresponding to the capacitance of the guard electrode 31b from the measured value M1 corresponding to the capacitance of the main electrode 31a in step S12, and then, the CPU 15 sets the corrected measured value M1 to be the passenger determination data.

After each step S10-S12, in step S13, the main electrode connection switch 13a1 turns off. In step S14, the sub electrode connection switch 13c1 turns on. In this case, since the sine wave from the signal source VSG is output in step S3 so that the sine wave output state is maintained, the passenger determination is performed based on the capacitance generated between the sub electrode 31c and the vehicle ground portion.

In step S15, the multiplexer 43 switches to a state that the potential difference between both ends of the current detection resistor RSc, which is connected to the sub electrode 31c, is detected. Thus, the current corresponding to the capacitance of the passenger detected by the sub electrode 31c is detected by the current detection unit 44. This current is converted by the voltage converter 45 to the voltage. The voltage is stored as the measured value S1 corresponding to the capacitance of the sub electrode 31c in the CPU 15 in step S16.

In step S17, the CPU 15 adds the measured value M1 corresponding to the capacitance of the main electrode 31a with the measured value S1 corresponding to the capacitance of the sub electrode 31c. This corrected measured value M1, i.e., the addition result value is defined as the passenger determination data. The CPU 15 identifies the passenger based on the passenger determination data.

Next, in step S18, the main electrode connection switch 13a1 turns on. In step S19, the sub electrode connection switch 13c2 turns on so that the sub electrode 31c is coupled with the vehicle ground portion. Thus, the wet condition of the seat in the vehicle is determined based o the capacitance generated between the main electrode 31a and the sub electrode 31c.

in step S20, the multiplexer 43 switches to a state that the potential difference between both ends of the current detection resistor RSa connected to the main eledrode 31a is detected. Thus, in step S21, the current corresponding to the capacitance of the passenger detected by the main electrode 31a is detected by the current detection unit 44. The current is converted by the voltage converter 45 to be the voltage. The CPU 15 recognizes this voltage as the measured value corresponding to the capacitance of the main electrode 31a. The CPU 15 determines the wet condition of the seat based on the measured value. After that, in step S22, the main electrode connection switch 13a1 turns off. In step S23, the guard electrode connection switch 13b1 turns off. In step S24, the sub electrode connection switch 13c1 turns off. Thus, the passenger identification process ends.

In the capacitive passenger detector 10, the main electrode 31a and the sub electrode 31c are spaced apart from each other, and they are arranged in the seat of the vehicle. The guard electrode 31b is disposed just under the main electrode 31a by a predetermined distance between the guard electrode 31b and the main electrode 31a. The guard electrode 31b is disposed between the vehicle body and the main electrode 31a. The capacitive sensor 31 includes the main electrode 31a, the sub electrode 31c and the guard electrode 31b. The detector 10 further includes the sensor characteristic measurement unit 14 and the CPU 15 as a calculation and control element.

The sensor characteristic measurement unit 14 includes the signal source VSG for applying the sine wave as an alternating voltage signal to the capacitive sensor 31, the switching unit 13 for switching the status so that the sine wave is selectively applied to the main electrode 31a, the sub electrode 31c and the guard electrode 31b, multiple current detection resistors RSa-RSc connected between the main electrode 31a, the sub electrode 31c or the guard electrode 31b and the signal source VSG via the switching unit 13, the multiplexer 43 as a selecting element for selecting the potential differences between both ends of the multiple current detection resistors RSa-RSc when the sine wave is applied to the main electrode 31a, the sub electrode 31c and the guard electrode 31b via the multiple current detection resistors RSa-RSc, the current detection unit 44 and the voltage converter 45 as a detection element for detecting the voltage generated by the potential difference, which is selected by the multiplexer 43.

The sensor characteristic measurement unit 14 provides to apply the sine wave to all of, some of or one of the main electrode 31a, the sub electrode 31c and the guard electrode 31b. The current flowing through the main electrode 31a, the sub electrode 31c and the guard electrode 31b generated in accordance with the sine wave application is selected and converted to be the voltage.

The CPU 15 sets the current flowing through the guard electrode 31b to be zero as a reference point when the main electrode 31a and the guard electrode 31b have the same potential based on the detection result of the voltage in the sensor characteristic measurement unit 14. The CPU 15 sets the current flowing direction of the current flowing through the guard electrode 31b to be the negative direction when the potential of the main electrode 31a detected by the sensor characteristic measurement unit 14 is higher than the potential of the guard electrode 31b detected by the sensor characteristic measurement unit 14. The CPU 15 sets the current flowing direction of the current flowing through the guard electrode 31b to be the positive direction when the potential of the main electrode 31a detected by the sensor characteristic measurement unit 14 is lower than the potential of the guard electrode 31b detected by the sensor characteristic measurement unit 14. When the current flowing through the guard electrode 31b is zero, the voltage corresponding to the main electrode 31a is defined as the measured value M1, and the measure value (i.e., the voltage) M1 is set to be the passenger determination data. When the current flows through the guard electrode 31b in the negative direction, the measured value G1 of the guard electrode 31b is add into the measured value M1 of the main electrode 31a, and the addition value is set to be the passenger determination data. When the current flows through the guard electrode 31b in the positive direction, the measured value G1 of the guard electrode 31b is subtracted from the measured value M1 of the main electrode 31a, and the subtraction value is set to be the passenger determination data.

Specifically, when the current flowing through the guard electrode 31b is zero, the potential difference between the main electrode 31a and the guard electrode 31b is zero. Thus, the measured value of the capacitance of the main electrode 31a is set to be the passenger determination data. However, when the current flows through the guard electrode in the negative direction, the potential of the main electrode 31a is higher than the potential of the guard electrode 31b so that the current flows from the main electrode 31a to the guard electrode 31b. Thus, the measured value G1 of the capacitance of the guard electrode 31b is added into the measured value M1 of the capacitance of the main electrode 31a. This addition corrects the measured value M1 to be the measured value M1 in a case where the potential difference between the main electrode 31a and the guard electrode 31b is zero. Thus, the addition value is set to be the passenger determination data.

When the current flows through the guard electrode in the positive direction, the potential of the main electrode 31a is lower than the potential of the guard electrode 31b so that the current flows from the guard electrode 31b to the main electrode 31a. Thus, the measured value G1 of the capacitance of the guard electrode 31b is subtracted from the measured value M1 of the capacitance of the main electrode 31a. This subtraction corrects the measured value M1 to be the measured value M1 in a case where the potential difference between the main electrode 31a and the guard electrode 31b is zero. Thus, the addition value is set to be the passenger determination data. Thus, even when the potential difference is generated between the main electrode 31a and the guard electrode 31b, the ECU 11 detects the passenger capacitance correctly.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A capacitive passenger detector for a vehicle comprising:
   a capacitive sensor including a main electrode, a sub electrode and a guard electrode, wherein the main electrode and the sub electrode are separated apart from each other, and disposed in a seat of a vehicle, and wherein the guard electrode is disposed between the main electrode and a body of the vehicle, and separated apart from the main electrode;
   a sensor characteristic measurement unit for applying an alternating voltage signal to the main electrode, the sub electrode and the guard electrode selectively or totally and for converting a current generated in the main electrode, the sub electrode and the guard electrode to a voltage, respectively; and
   a controller,
   wherein the controller defines a current flowing through the guard electrode to be a reference current when a voltage of the main electrode and a voltage of the guard electrode have a same potential,
   wherein the controller defines a current flowing direction of the current flowing through the guard electrode to be a negative direction when the voltage of the main electrode is higher than the voltage of the guard electrode,
   wherein the controller defines the current flowing direction of the current flowing through the guard electrode to be a positive direction when the voltage of the main electrode is lower than the voltage of the guard electrode, and
   wherein the controller corrects the voltage of the main electrode based on the current flowing through the guard electrode so that a corrected voltage of the main electrode is set to be a passenger determination data.

2. The capacitive passenger detector according to claim 1, wherein the controller sets the voltage of the main electrode to be the passenger determination data when the current flowing through the guard electrode is the reference current.

3. The capacitive passenger detector according to claim 1, wherein the controller corrects the voltage of the main electrode in such a manner that the voltage of the guard electrode is add into the voltage of the main electrode when the current flowing direction of the guard electrode is the negative direction, and
wherein the controller sets the corrected voltage of the main electrode to be the passenger determination data.

4. The capacitive passenger detector according to claim 1, wherein the controller corrects the voltage of the main electrode in such a manner that the voltage of the guard electrode is subtracted from the voltage of the main electrode when the current flowing direction of the guard electrode is the positive direction, and
wherein the controller sets the corrected voltage of the main electrode to be the passenger determination data.

5. The capacitive passenger detector according to claim 1, wherein the sub electrode is arranged on a front side of the vehicle from the main electrode, and
wherein the guard electrode is disposed below the main electrode.

6. The capacitive passenger detector according to claim 5, wherein the controller corrects the voltage of the main electrode in such a manner that the voltage of the sub electrode is added into the voltage of the main electrode, and
wherein the controller sets the corrected voltage of the main electrode to be another passenger determination data.

7. The capacitive passenger detector according to claim 6, wherein the voltage of the main electrode corresponds to a capacitance between the main electrode and a ground,
wherein the voltage of the guard electrode corresponds to a capacitance between the guard electrode and the ground, and
wherein the voltage of the sub electrode corresponds to a capacitance between the sub electrode and the ground.

* * * * *